United States Patent
Reddy et al.

(10) Patent No.: US 9,891,691 B2
(45) Date of Patent: Feb. 13, 2018

(54) REDUCING PIN COUNT REQUIREMENTS FOR IMPLEMENTATION OF INTERCONNECT IDLE STATES

(71) Applicant: Intel Corporation, Santa Clara, CA (US)

(72) Inventors: Naveen Gopal Reddy, Bangalore (IN); Bharath Kumar, Bangalore (IN); Robert E. Gough, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 587 days.

(21) Appl. No.: 14/039,220

(22) Filed: Sep. 27, 2013

(65) Prior Publication Data

US 2015/0095670 A1    Apr. 2, 2015

(51) Int. Cl.
*G06F 1/00*    (2006.01)
*G06F 1/32*    (2006.01)

(52) U.S. Cl.
CPC ........ *G06F 1/3243* (2013.01); *Y02B 60/1239* (2013.01)

(58) Field of Classification Search
CPC .... G06F 1/3287; G06F 11/1441; G06F 1/325; G06F 9/4418; G06F 1/3215; G06F 21/85
See application file for complete search history.

(56) References Cited

U.S. PATENT DOCUMENTS

| | | | | |
|---|---|---|---|---|
| 6,085,325 A * | 7/2000 | Jackson | ................... | G06F 1/08 365/222 |
| 7,380,144 B2 | 5/2008 | Green | | |
| 2002/0116652 A1 * | 8/2002 | Chen | ................... | G06F 1/3228 713/300 |
| 2002/0169916 A1 * | 11/2002 | Yu | ................... | G06F 13/385 710/305 |
| 2005/0114723 A1 * | 5/2005 | Ho | ................... | G06F 1/3215 713/323 |
| 2008/0028111 A1 * | 1/2008 | Lin | ................... | G06F 13/4221 710/71 |
| 2010/0079444 A1 * | 4/2010 | Kyriazis | ................... | G06T 3/4092 345/418 |
| 2011/0075862 A1 * | 3/2011 | Lin | ................... | H03G 3/34 381/107 |

(Continued)

OTHER PUBLICATIONS

Non-Final Office Action issued in U.S. Appl. No. 14/212,135, dated Oct. 23, 2015.

(Continued)

*Primary Examiner* — Thomas Lee
*Assistant Examiner* — Zhipeng Wang
(74) *Attorney, Agent, or Firm* — Alpine Technology Law Group LLC

(57) ABSTRACT

Methods and apparatus relating to reducing pin count requirements for implementation of interconnect idle state (s) are described. In one embodiment, logic receives a general purpose input signal on a signal pin of an Input/Output (I/O) complex logic in response to a control signal. An I/O device (e.g., coupled to the I/O complex logic) enters a low power consumption state in response to the control signal. The logic receives a wake signal on the signal pin of the I/O complex logic and the I/O device exits the low power consumption state in response to the wake signal. Other embodiments are also claimed and disclosed.

25 Claims, 8 Drawing Sheets

(56) References Cited

U.S. PATENT DOCUMENTS

| | | | |
|---|---|---|---|
| 2013/0173945 A1* | 7/2013 | Li | G06F 1/3203 713/324 |
| 2013/0246821 A1* | 9/2013 | Chang | G06F 1/3215 713/322 |
| 2013/0254571 A1* | 9/2013 | Tian | H04W 52/0274 713/323 |
| 2013/0290758 A1 | 10/2013 | Quick et al. | |
| 2014/0075066 A1* | 3/2014 | Menard | G06F 1/3243 710/104 |
| 2014/0281635 A1 | 9/2014 | Reddy | |

OTHER PUBLICATIONS

Office Action received for U.S. Appl. No. 14/212,135, dated Jun. 3, 2016, 11 pages.
Office Action received for U.S. Appl. No. 14/212,135, dated Feb. 13, 2017, 12 pages.

\* cited by examiner

REDUCING PIN COUNT REQUIREMENTS FOR IMPLEMENTATION OF INTERCONNECT IDLE STATES

FIELD

The present disclosure generally relates to the field of electronics. More particularly, an embodiment relates to reducing pin count requirements for implementation of interconnect idle state(s).

BACKGROUND

To reduce power consumption, some systems include processors with the ability to perform at various low power (Cx) or idle states. Each C state may indicate a certain level of functionality and corresponding power state. For example, C0 may indicate the processor is operating at normal levels, C1 may indicate the processor is not executing instructions but may return to an executing state quickly, etc.

However, as the need for more power efficient systems arises, e.g., to allow for all day operation using battery power from a single charge, such coarse power reduction solutions that are solely based on processor states may fall short.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
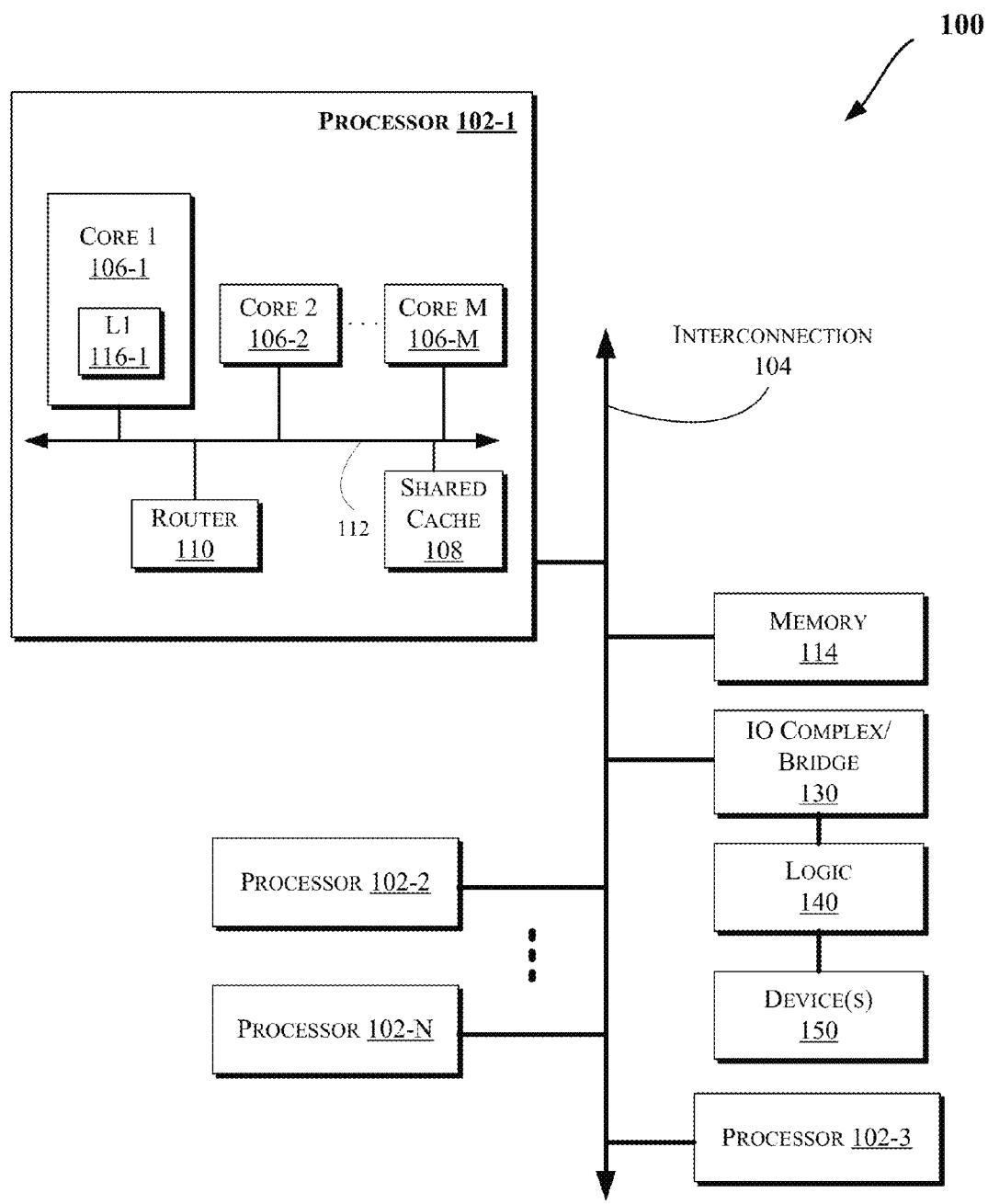
FIGS. 1 and 5-7 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Power management is crucial for mobile devices (such as phones, tablets, UMPC (Ultra-Mobile Personal Computer), laptop computers, etc.) and hence it is critical that such platforms are highly optimized from a power and performance point of view. For example, one of the requirements of Ultrabook™ platforms is to provide whole day battery life (e.g., from a single charge) to the users in a thin form factor. Also, platform designers have to focus on minimizing idle power consumption in platform to meet the Microsoft Windows® 8 connected standby power requirements. Minimizing platform idle power consumption can further enable designers to use a smaller battery to achieve the battery life targets or weight goals, along with new form factor designs.

Moreover, to minimize platform power consumption in idle states some mobile platforms (such as Ultrabook, laptop, convertible, etc. platforms) may support Run Time D3 (RTD3), where platform devices can be selectively turned off while in S0iX system states to minimize platform power consumption. Which of the devices can be turned off is decided based on user activity, the need for a particular device, and/or the exit latencies involved. In some implementations, power gating switches may be controlled at the hardware level through the General Purpose Input Output (GPIO) signals generated by an I/O (Input/Output, also referred to as IO herein) complex (e.g., responsible for control of I/O pathways in and out of a platform or system), which may also be referred to herein interchangeably as a Platform Controller Hub (PCH), a bridge logic, etc. In turn, it is the platform designer's responsibility to map the GPIOs to the specific power gating devices and communicate to the software designers to drive the appropriate logic to control the switches. As discussed herein, "software" is intended to encompass software application(s), operating system(s), firmware, etc. including instructions stored, e.g., on non-transitory, computer-readable medium.

Generally, "S0ix" or "S0iX" refers to improved idle power state(s) achieved by platform-level power management that is event driven (e.g., based on OS or software application input) instead of a traditional idle power state that is driven either by a user or based on a determination that a platform has been idle for too long (based on a pre-programmed time). In some embodiments, at least some of the power consumption states discussed herein may be in accordance with or similar to those defined under Advanced Configuration and Power Interface (ACPI) specification, Revision 5, December 2011. For example, "S3" generally refers to a power state such as standby, sleep, and/or suspend to Random Access Memory (RAM), e.g., while the RAM remains powered to maintain data correctness. "Sx" refers to deeper sleep (such as S3, S4, or S5), etc.

Some embodiments reduce pin count requirements for implementation of idle state(s) in an interconnect (such as Peripheral Component Interconnect (PCI), e.g., in accordance with the PCI Express (PCIE) Base Specification, Revision 2.0, 2006, and/or PCIE Base Specification 3.0, Revision 0.5, August 2008). Such techniques may also provide for power consumption reduction (e.g., in System on Chip (SOC) platforms) during idle state(s). In an embodiment, power consumption is controlled through RTD3 switches/gates by modifying one or more signals and/or one or more pins. In one embodiment, logic (e.g., logic 140 of FIG. 1 coupled between an I/O complex/bridge and one or more IO devices) allows for control of the power states of one or more IO devices.

The techniques discussed herein may be used in any type of a computing system with power consumption settings, such as the systems discussed with reference to FIGS. 1 and 5-7 (which may include a mobile device such as a smartphone, tablet, UMPC (Ultra-Mobile Personal Computer), laptop computer, Ultrabook computing device, smart watch, smart glasses, etc.). More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5-7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache 116-1 (generally referred to herein as "L1 cache 116").

In one embodiment, logic 140 controls and/or reduces power consumption by one or more devices 150 during system idle state(s). For example, logic 140 is coupled between I/O complex 130 and one or more devices 150 and controls power consumption by the one or more devices 150 via modifying one or more signals to control RTD3 switch(es). While I/O complex 130 may be used in some embodiments, other types of logic such as a bridge, control logic, etc. may be used instead of or in addition to a I/O complex to couple logic 140 to the system 100 (e.g., via bus/interconnection 104). In some embodiments, power consumption control may also be achieved (e.g., by logic 140) based, at least in part, on input from OS (Operating System) software and/or software application(s) (e.g., that may be stored in the memory 114).

Moreover, the ability to control the level of power consumption may be used to optimize platform power consumption in response to various determinations such as based on the workload, scenario, usage, one or more sensed temperature values (e.g., as detected by one or more temperature sensors (not shown) located within proximity of one or more of the components of the systems discussed herein, e.g., with reference to FIGS. 1, 2, 3A-3B, 5, 6, and/or 7), etc. Furthermore, at least some OS operations discussed herein may be interchangeably performed by software applications, firmware, etc.

Figure 2:
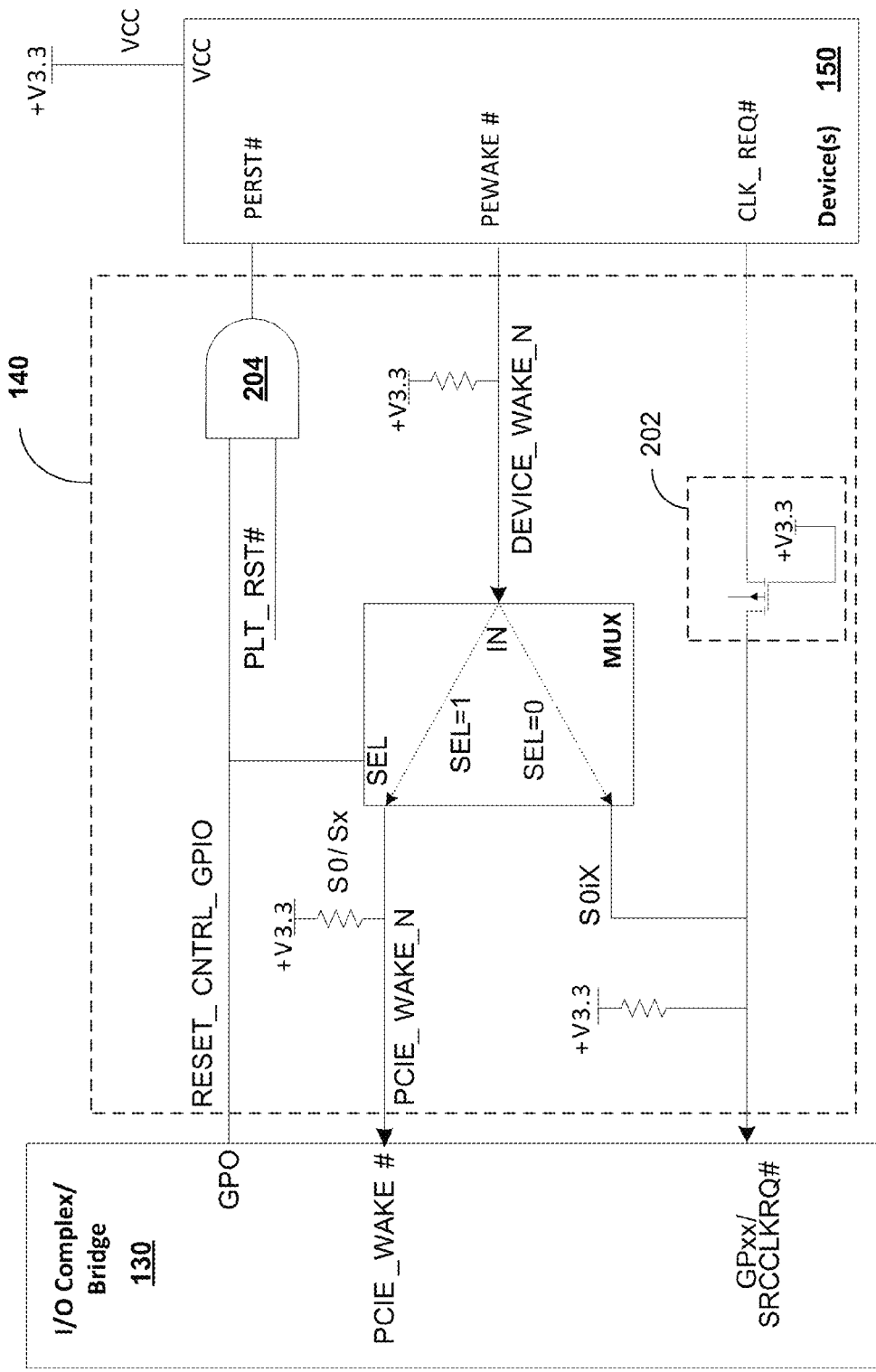
FIGS. 2, 3A, and 3B illustrate block diagrams of components of a power management architecture that may be used to implement one or more embodiments discussed herein.
Figure 3A:
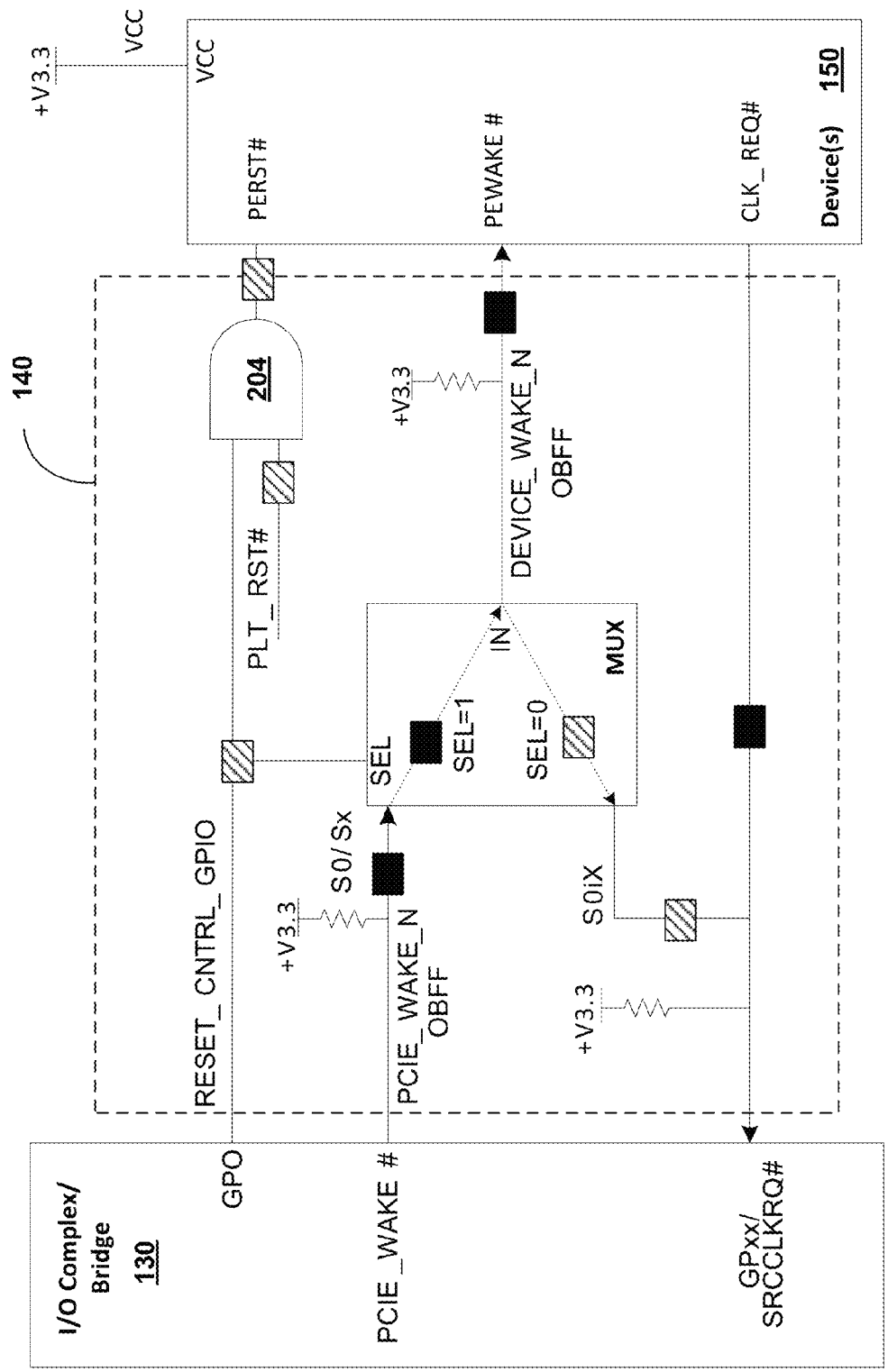
Figure 3B:
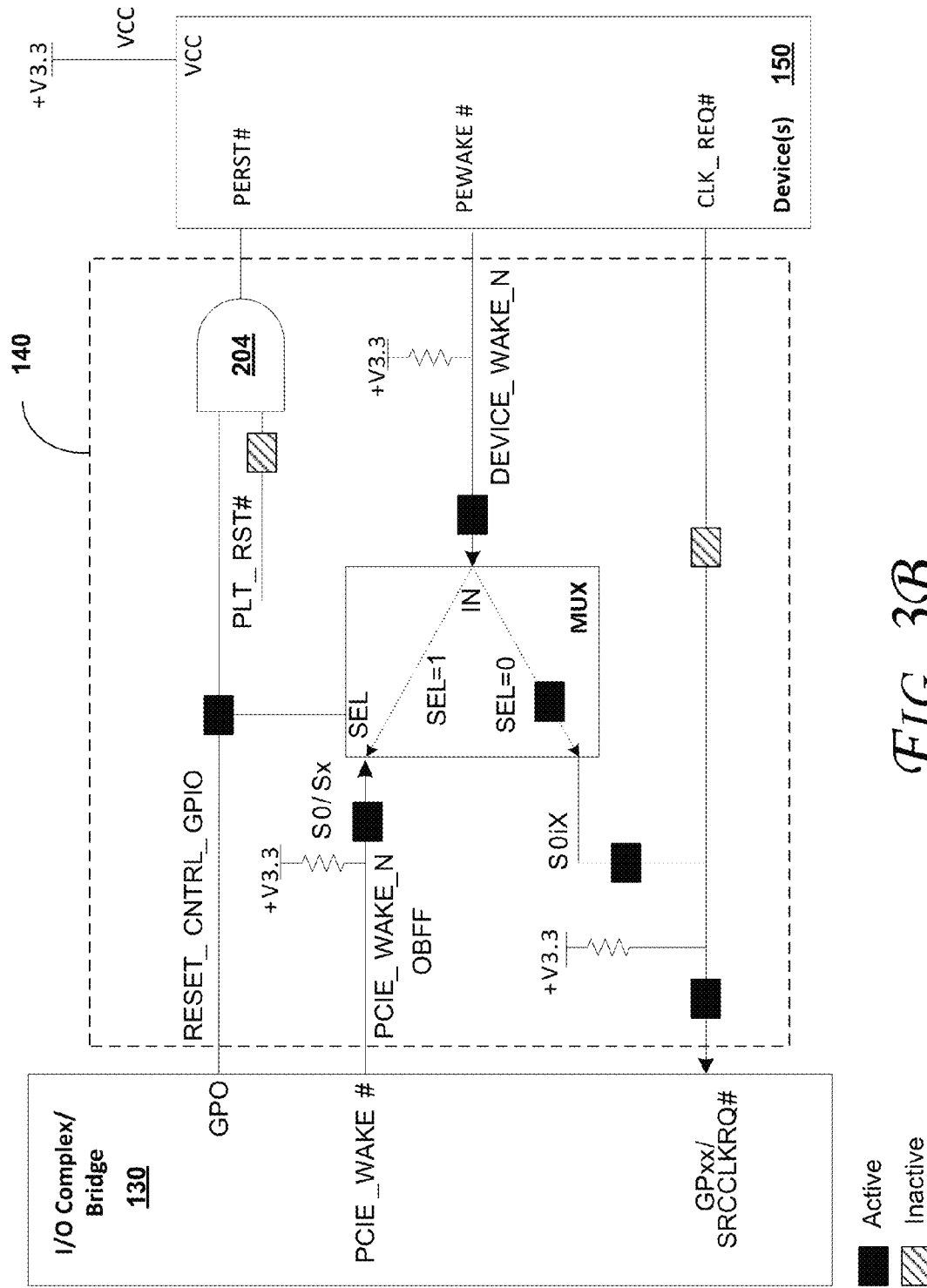

FIGS. 2, 3A, and 3B illustrate block diagrams of components of a power management architecture that may be used to implement one or more embodiments discussed herein. In FIGS. 2 and 3A-3B, PLT_RST# signal refers to Platform reset signal, RESET_CNTRL-GPIO refers to a signal to control reset of IO (e.g., PCIE device), PCIE_WAKE# refers to a signal indicating to the I/O complex/bridge 130 to wake up (e.g., based on indication of a wake event), MUX is a multiplexor, GPI refers to a General Purpose Input, GPO refers to a General Purpose Output, GPxx refers to General Purpose pin xx, PEWAKE# refers to device Wake signal which is used by the device to wake up the platform.

In some implementations, GPIOs are used to control the PERST# (Platform Reset) signal (that puts an IO device (e.g., device(s) 150) into reset), and route the WAKE# signal (IO device(s) 150 indicates system is to wake from low power state) to appropriate pins based on system state. Another GPIO is configured for CLKREQ# signal functionality, e.g., to run clocks when requested by the PCIE or IO device, e.g., as defined in the PCIE Specification. The WAKE signals (e.g., shown as DEVICE_WAKE_N in FIG. 2) are routed to the traditional PCIE_WAKE# pins while the system is in Sx or S0 (for OBFF (Optimized Buffer Flush/Fill) communication, e.g., per PCIE Specification), while the PEWAKE# signal from the device(s) 150 is routed to a dedicated GPIO in case of PCIE device in RTD3 (e.g., to ensure that I/O complex 130 can continue with PCIE_WAKE# signal functionality as well as monitor wake from PCIE devices which are in D3 states). In summary, three additional GPIOs are required from the I/O complex/bridge 130 to support RTD3 functionality on a wake capable PCIE device.

Moreover, in some implementation, a GPxx/SRC-CLKRQ# pin of the I/O complex 130 and a separate GPI pin to monitor the WAKE# signal while in RTD3 are mutually exclusive and at any given time only one of the signal functionality is utilized. Table 1 below summarizes the behavior.

TABLE 1

| System State | GPxx/SRCCLKRQ# | GPI (used for wake) |
|---|---|---|
| Sx | CLKREQ# signal functionality | Not used |
| S0 | CLKREQ# signal functionality | Not used |
| RTD3 (or S0i3) | Not used, Clocks are stopped in RTD3 and CLKREQ# signal is held high by on board isolation logic | Monitor Wake event from the PCIE device |

An embodiment utilizes this behavior and consolidates both of the GPxx/SRCCLKRQ# and GPI signals into a single pin and, as a result, saves a GPIO pin of I/O complex 130 (the simplified implementation would then looks as shown in FIG. 2 according to an embodiment).

Referring to FIG. 2, the GPxx/SRCCLKRQ# pin is repurposed to handle both of the functionalities for GPxx/SRCCLKRQ# and GPI signals. Furthermore, for devices which can set CLKREQ# signal high in D3, an isolation Field Effect Transistor 202 (or "FET," which couples CLK_REQ# and GPxx/SRCCLKRQ# pins (not shown)) can be omitted.

FIG. 3A shows the system of FIG. 2 in S0 state, according to an embodiment. In FIGS. 3A-3B, active lines are marked by a solid box and inactive lines are marked by a shaded box. As shown in FIG. 3A, GPxx/SRCCLKRQ# pin is in the SRCCLKRQ# mode and is responsible for CLKREQ# signal functionality. By contrast, while in Sx state, the diagram would remain the same but with PCIEWAKE# signal acting as input into I/O complex/bridge 130 for monitoring the wake signals.

FIG. 3B illustrates the systems of FIGS. 2 and 3A in RTD3 (or S0i3) state, according to an embodiment. Here the GPxx/SRCCLKRQ# pin acts as GPIO and the PEWAKE# signal from the IO device 150 is routed to this pin and the I/O complex/bridge 130 can monitor for wake events through this pin. The CLK_REQ# signal from the device 150 is expected to be held high (or an isolation FET needs to be added inline between the device 150 and I/O complex 130 to couple CLK_REQ# pin to GPxx/SRCCLKRQ# pin). In such an embodiment, the signal from the I/O complex/bridge 130 is configured for appropriate function corresponding to each state and this needs to done at appropriate time so that there is a seamless transition between the states with no loss of functionality.

Figure 4:
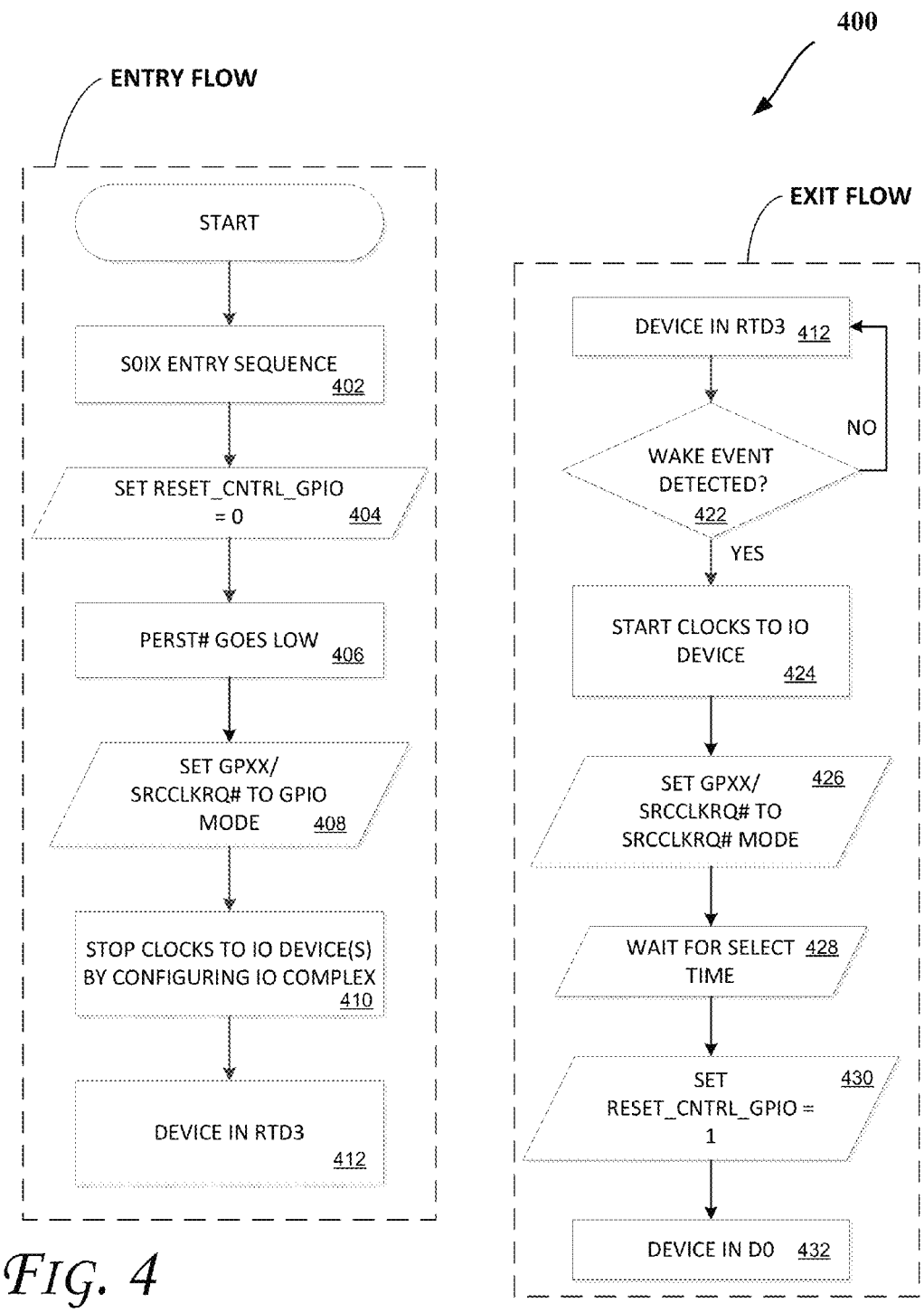
FIG. 4 illustrates a flow diagram of a method according to an embodiment.

FIG. 4 illustrates a flow diagram of a method 400 for entry and exit sequences, according to some embodiments. Various components discussed herein (e.g., with reference to FIGS. 1-3B and/or 5-7) may be utilized to perform one or more of the operations of method 400.

Referring to FIGS. 2-4, after start of the entry flow, SOIX state entry sequence/operation(s) are performed at operation 402 (e.g., to allow for the BIOS (Basic Input Output System) to configure the GPIO and SRCCLKREQ# functionality as discussed above with reference to FIGS. 2, 3A, and/or 3B). In an embodiment, the BIOS flow needs to only ensure that the configuration of GPIO or SRCCLKREQ# signal functionality is selected prior to device entering or exiting RTD3 state. At an operation 404, the RESET_CNTRL_GPIO is initialized (e.g., set to 0 or 1 depending on the implementation) which causes the output of the AND gate in FIG. 3A to go low. At operation 406, a change (e.g., deassertion or going low) of PERST# signal occurs (e.g., per operation 404 and the output of the AND gate). At an operation 408, GPxx/SRCCLKRQ# is set to GPIO mode. Next, the clock(s) to selected device(s) 150 are stopped (e.g., by configuring the IO complex 130). At operation 412, the selected device(s) 150 enter a low/idle power consumption state such as RTD3.

After entry into low/idle power consumption state (such as RTD3) following operations 402-412, method 400 may exit such states by performing the remaining operations of FIG. 4 to exit. More particularly, after a device is in low/idle power consumption state (such as RTD3), an operation 422 determines whether a wake event is detected (e.g., on the GPxx/SRCCLKRQ# pin). Once a wake event is detected, an operation 424 starts the clock(s) to the device(s) 150 associated with the wake event of operation 422 (e.g., by configuring the IO complex 130). At an operation 426, GPxx/SRCCLKRQ# is set to SRCCLKRQ# mode. At an operation 428, method 400 waits for a programmable amount of time (for example 100 us in an embodiment) that may be implemented by programming a timer and waiting for its expiration. At an operation 430, the RESET_CNTRL_GPIO is updated (e.g., set to 1, to negate its initialization at operation 404). In turn, at operation 432, the selected device(s) 150 exits its low/idle power state and enters an operational state (e.g., D0 state).

In some embodiments, operations 408 and/or 426 are performed by updating one or more stored bits of data (which may be stored in any type of a storage unit, such as any of the storage devices discussed herein, including a register, a bit in a volatile or non-volatile storage device, etc.). Accordingly, by rolling in the CLKREQ# signal and WAKE# signal monitoring functionality into a single pin with changes in entry and exit sequence as discussed above at least one GPIO pin may be saved on the I/O complex/bridge 130 for each wake capable PCIE device that needs RTD3 feature. If there are multiple PCIE RTD3 devices, such embodiments can result in GPIO savings which can be utilized by platform designers for other purposes or these GPIO pins can be removed from the I/O complex/bridge 130 resulting in saving precious silicon area. Also, such techniques can save the power consumed by GPIO buffers of the I/O complex/bridge 130. This can help enable lower I/O complex/bridge 130 and platform power consumption, and target low power platforms for convertible designs.

Figure 5:
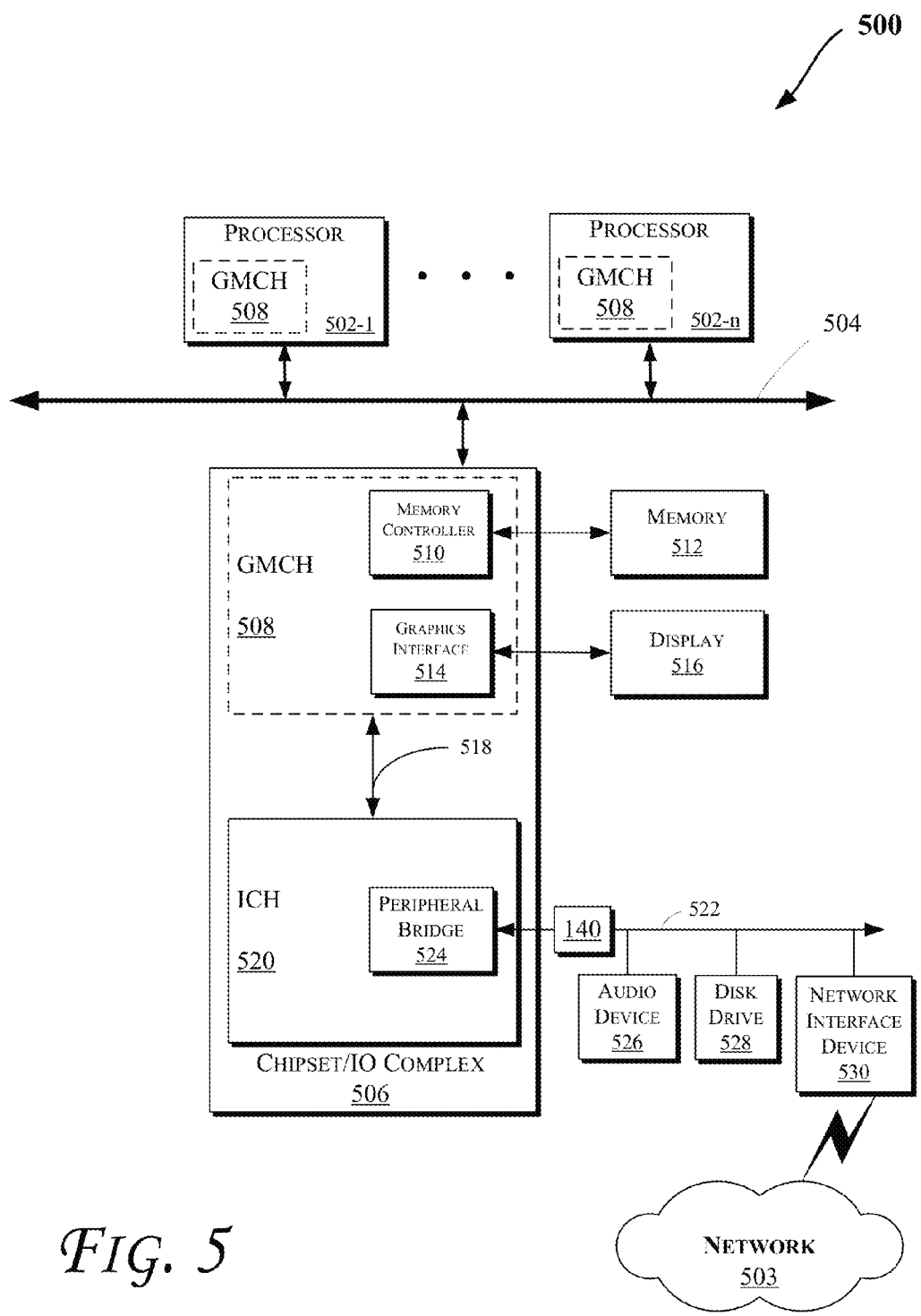

FIG. 5 illustrates a block diagram of a computing system 500 in accordance with an embodiment. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)).

Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more components of system 500 may include one or more of items 130, 140, and 150 discussed with reference to FIGS. 1-4. Also, the operations discussed with reference to FIGS. 1-4 may be performed by one or more components of the system 500.

A chipset 506 may also communicate with the interconnection network 504. The chipset 506 may include a graphics memory control hub (GMCH) 508, which may be located in various components of system 500 (such as those shown in FIG. 5). The GMCH 508 may include a memory controller 510 that communicates with a memory 512 (which may be the same or similar to the memory 114 of FIG. 1). The memory 512 may store data, including sequences of instructions, that may be executed by the CPU 502, or any other device included in the computing system 500. In one embodiment, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a display device 516. In one embodiment, the graphics interface 514 may communicate with the display device 516 via an accelerated graphics port (AGP) or Peripheral Component Interconnect (PCI) (or PCI express (PCIe) interface). In an embodiment, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the GMCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the GMCH 508 in some embodiments. In addition, the processor 502 and the GMCH 508 may be combined to form a single chip. Furthermore, a graphics accelerator may be included within the GMCH 508 in other embodiments.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
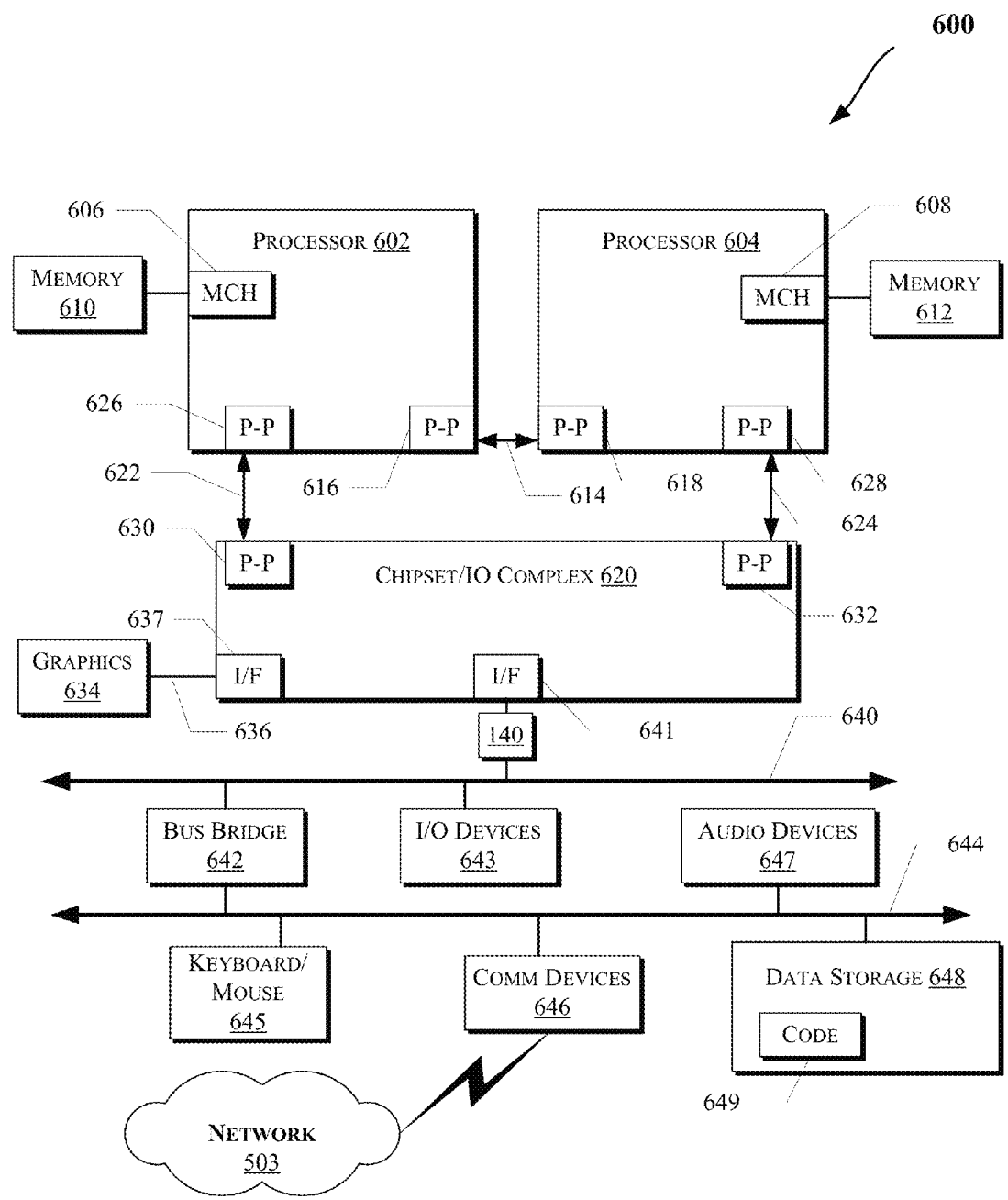

FIG. 6 illustrates a computing system 600 that is arranged in a point-to-point (PtP) configuration, according to an embodiment. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment may be provided within the processors 602 and 604. For example, one or more components of system 600 may include one or more of items 130, 140, and 150 of FIGS. 1-5, including located within the processors 602 and 604. Other embodiments, however, may exist in other circuits, logic units, or devices within the system 600 of FIG. 6. Furthermore, other embodiments may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

Figure 7:
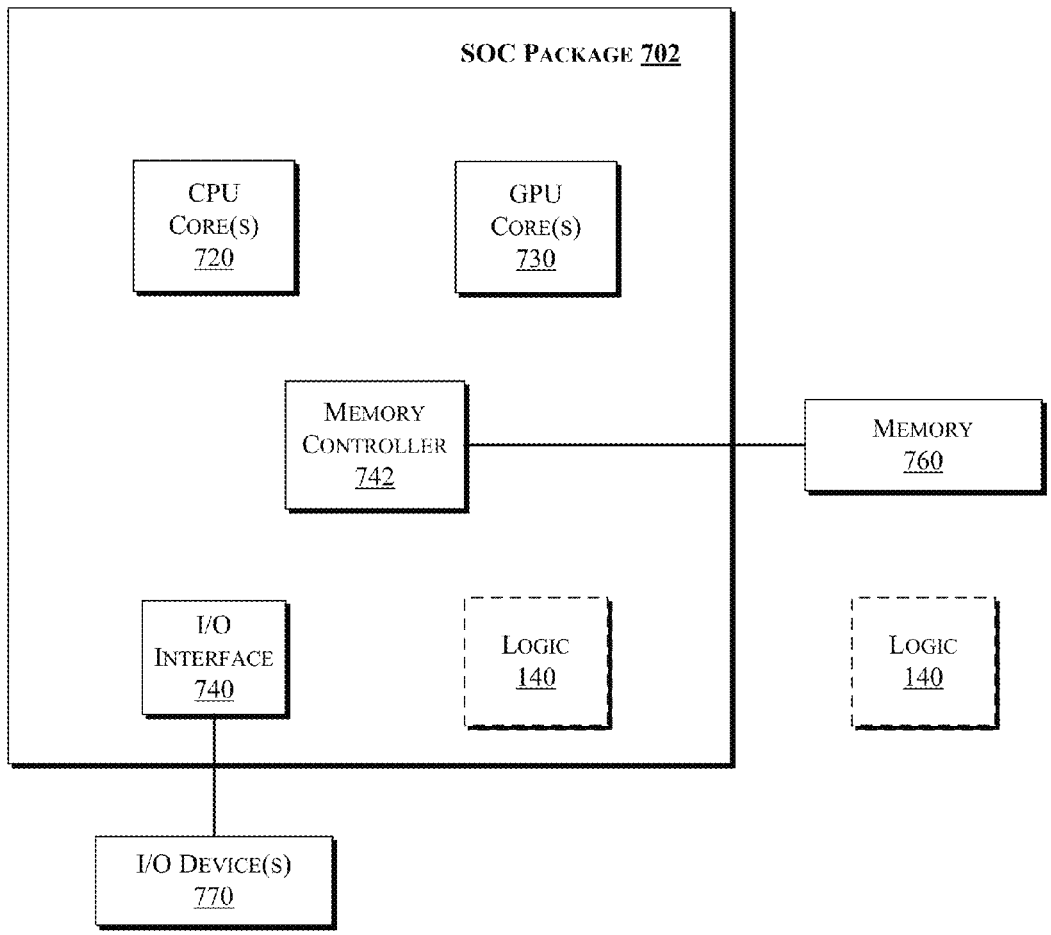

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like. Furthermore, SOC package 702 may include/integrate the logic 140 in an embodiment. Alternatively, the logic 140 may be provided outside of the SOC package 702 (i.e., as a discrete logic).

The following examples pertain to further embodiments. Example 1 includes 1 includes an apparatus comprising: logic, the logic at least partially comprising hardware logic, to receive a general purpose input signal on a signal pin of an Input/Output (I/O) complex logic in response to a control signal, wherein an I/O device coupled to the I/O complex logic is to enter a low power consumption state in response to the control signal, wherein the logic to receive the general purpose input signal is to receive a wake signal on the signal pin of the I/O complex logic, wherein the I/O device is to exit the low power consumption state in response to the wake signal. Example 2 includes the apparatus of example 1, wherein the I/O complex logic is to stop transmission of one or more clock signals to the I/O device in response to the control signal. Example 3 includes the apparatus of example 1, wherein the I/O complex logic is to start transmission of one or more clock signals to the I/O device in response to the wake signal. Example 4 includes the apparatus of example 1, wherein the I/O complex logic is to generate one or more general purpose input output signals in response to an indication from software. Example 5 includes the apparatus of example 4, wherein a Basic Input Output System (BIOS) is to configure the one or more general purpose input output signals. Example 6 includes the apparatus of example 1, wherein the I/O device is to wait for expiration of a timer prior to exit from the low power consumption state. Example 7 includes the apparatus of example 1, wherein the low power consumption state is compliant with a run time D3 state. Example 8 includes the apparatus of example 1, further comprising memory to store operating system software, wherein the operating system software is to control a power state of the I/O device via one or more general purpose input output signals. Example 9 includes the apparatus of example 1, wherein the logic, one or more processor cores, and memory are located on a single integrated circuit die.

Example 10 includes a method comprising: receiving a general purpose input signal on a signal pin of an Input/Output (I/O) complex logic in response to a control signal, wherein an I/O device coupled to the I/O complex logic is to enter a low power consumption state in response to the control signal, wherein a wake signal received on the signal pin of the I/O complex logic causes the I/O device to exit the low power consumption state. Example 11 includes the method of example 10, further comprising the I/O complex logic stopping transmission of one or more clock signals to the I/O device in response to the control signal. Example 12 includes the method of example 10, further comprising the I/O complex logic starting transmission of one or more clock signals to the I/O device in response to the wake signal. Example 13 includes the method of example 10, further comprising the I/O complex generating one or more general purpose input output signals in response to an indication from software. Example 14 includes the method of example 13, further comprising a Basic Input Output System (BIOS) configuring the one or more general purpose input output signals. Example 15 includes the method of example 10, further comprising the I/O device waiting for expiration of a timer prior to exit from the low power consumption state. Example 16 includes the method of example 10, further comprising storing operating system software in memory, wherein the operating system software controls a power state of the I/O device via one or more general purpose input output signals.

Example 17 includes a system comprising: an I/O complex to generate one or more general purpose input output signals; logic, the logic at least partially comprising hardware logic, to receive a general purpose input signal on a signal pin of the I/O complex logic in response to a control signal, wherein an I/O device coupled to the I/O complex logic is to enter a low power consumption state in response to the control signal, wherein the logic to receive the general purpose input signal is to receive a wake signal on the signal pin of the I/O complex logic, wherein the I/O device is to exit the low power consumption state in response to the wake signal. Example 18 includes the system of example 17, wherein the I/O complex logic is to stop transmission of one or more clock signals to the I/O device in response to the control signal. Example 19 includes the system of example 17, wherein the I/O complex logic is to start transmission of one or more clock signals to the I/O device in response to the wake signal. Example 20 includes the system of example 17, wherein the I/O complex logic is to generate one or more general purpose input output signals in response to an indication from software. Example 21 includes the system of example 20, wherein a Basic Input Output System (BIOS) is to configure the one or more general purpose input output signals. Example 22 includes the system of example 17, wherein the I/O device is to wait for expiration of a timer prior to exit from the low power consumption state. Example 23 includes the system of example 17, wherein the low power consumption state is compliant with a run time D3 state. Example 24 includes the system of example 1 further comprising memory to store operating system software, wherein the operating system software is to control a power state of the I/O device via one or more general purpose input output signals. Example 25 includes the system of example 17, wherein the logic, one or more processor cores, and memory are located on a single integrated circuit die.

Example 26 includes a computer-readable medium comprising one or more instructions that when executed on a processor configure the processor to perform one or more operations of any of examples 10 to 16.

Example 27 includes an apparatus comprising means for performing one or more operations of any of examples 10 to 16.

In various embodiments, the operations discussed herein, e.g., with reference to FIGS. 1-7, may be implemented as hardware (e.g., logic circuitry), software, firmware, or combinations thereof, which may be provided as a computer program product, e.g., including (e.g., a non-transitory) machine-readable or computer-readable medium having stored thereon instructions (or software procedures) used to program a computer to perform a process discussed herein. The machine-readable medium may include a storage device such as those discussed with respect to FIGS. 1-7.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic, the logic at least partially comprising hardware logic, to receive a general purpose input signal on a signal pin of an Input/Output (I/O) complex logic in response to a control signal, wherein an I/O device coupled to the I/O complex logic is to enter a low power consumption state in response to the control signal,
   wherein the logic to receive the general purpose input signal is to receive a wake signal on the signal pin of the I/O complex logic, wherein the I/O device is to exit the low power consumption state in response to the wake signal, wherein the I/O device is to communicate with the I/O complex logic only through the logic to receive the general purpose input signal.

2. The apparatus of claim 1, wherein the I/O complex logic is to stop transmission of one or more clock signals to the I/O device in response to the control signal.

3. The apparatus of claim 1, wherein the I/O complex logic is to start transmission of one or more clock signals to the I/O device in response to the wake signal.

4. The apparatus of claim 1, wherein the I/O complex logic is to generate one or more general purpose input output signals in response to an indication from software.

5. The apparatus of claim 4, wherein a Basic Input Output System (BIOS) is to configure the one or more general purpose input output signals.

6. The apparatus of claim 1, wherein the I/O device is to wait for expiration of a timer prior to exit from the low power consumption state.

7. The apparatus of claim 1, wherein the low power consumption state is compliant with a run time D3 state.

8. The apparatus of claim 1, further comprising memory to store operating system software, wherein the operating system software is to control a power state of the I/O device via one or more general purpose input output signals.

9. The apparatus of claim 1, wherein the logic, one or more processor cores, and memory are located on a single integrated circuit die.

10. A method comprising:
    receiving, at a first logic, a general purpose input signal on a signal pin of an Input/Output (I/O) complex logic in response to a control signal, wherein an I/O device coupled to the I/O complex logic is to enter a low power consumption state in response to the control signal,
    wherein a wake signal received on the signal pin of the I/O complex logic causes the I/O device to exit the low power consumption state, wherein the I/O device communicates with the I/O complex logic only through the first logic.

11. The method of claim 10, further comprising the I/O complex logic stopping transmission of one or more clock signals to the I/O device in response to the control signal.

12. The method of claim 10, further comprising the I/O complex logic starting transmission of one or more clock signals to the I/O device in response to the wake signal.

13. The method of claim 10, further comprising the I/O complex generating one or more general purpose input output signals in response to an indication from software.

14. The method of claim 13, further comprising a Basic Input Output System (BIOS) configuring the one or more general purpose input output signals.

15. The method of claim 10, further comprising the I/O device waiting for expiration of a timer prior to exit from the low power consumption state.

16. The method of claim 10, further comprising storing operating system software in memory, wherein the operating system software controls a power state of the I/O device via one or more general purpose input output signals.

17. A system comprising:
    an I/O complex logic to generate one or more general purpose input output signals;
    logic, the logic at least partially comprising hardware logic, to receive a general purpose input signal on a signal pin of the I/O complex logic in response to a control signal, wherein an I/O device coupled to the I/O complex logic is to enter a low power consumption state in response to the control signal,
    wherein the logic to receive the general purpose input signal is to receive a wake signal on the signal pin of the I/O complex logic, wherein the I/O device is to exit the low power consumption state in response to the wake signal, wherein the I/O device is to communicate with the I/O complex logic only through the logic to receive the general purpose input signal.

18. The system of claim 17, wherein the I/O complex logic is to stop transmission of one or more clock signals to the I/O device in response to the control signal.

19. The system of claim 17, wherein the I/O complex logic is to start transmission of one or more clock signals to the I/O device in response to the wake signal.

20. The system of claim 17, wherein the I/O complex logic is to generate one or more general purpose input output signals in response to an indication from software.

21. The system of claim 20, wherein a Basic Input Output System (BIOS) is to configure the one or more general purpose input output signals.

22. The system of claim 17, wherein the I/O device is to wait for expiration of a timer prior to exit from the low power consumption state.

23. The system of claim 17, wherein the low power consumption state is compliant with a run time D3 state.

24. The system of claim 1 further comprising memory to store operating system software, wherein the operating system software is to control a power state of the I/O device via one or more general purpose input output signals.

25. The system of claim 17, wherein the logic, one or more processor cores, and memory are located on a single integrated circuit die.

* * * * *